United States Patent
Alexandrovichserov et al.

(10) Patent No.: US 7,732,087 B2
(45) Date of Patent: Jun. 8, 2010

(54) CATALYST FOR FUEL CELL, AND MEMBRANE-ELECTRODE ASSEMBLY FOR FUEL CELL AND FUEL CELL SYSTEM INCLUDING SAME

(75) Inventors: Alexey Alexandrovichserov, Suwon-si (KR); Chan Kwak, Suwon-si (KR); Si-Hyun Lee, Suwon-si (KR)

(73) Assignee: Samsung SDI Co., Ltd., Yeongtong-gu, Suwon-si, Gyeonggi-do (KR)

(*) Notice: Subject to any disclaimer, the term of this patent is extended or adjusted under 35 U.S.C. 154(b) by 446 days.

(21) Appl. No.: 11/725,552

(22) Filed: Mar. 20, 2007

(65) Prior Publication Data
US 2007/0218350 A1    Sep. 20, 2007

(30) Foreign Application Priority Data
Mar. 20, 2006    (KR)    .............. 10-2006-0025235

(51) Int. Cl.
*H01M 4/00* (2006.01)
*B01J 27/057* (2006.01)
(52) U.S. Cl. .............................. 429/44; 502/215
(58) Field of Classification Search ............. 429/40, 429/41, 42, 43, 44
See application file for complete search history.

(56) References Cited

U.S. PATENT DOCUMENTS

| 7,014,931 B1* | 3/2006 | Zhu et al. ............... 429/19 |
| 2006/0073966 A1* | 4/2006 | Kourtakis .............. 502/185 |
| 2007/0111084 A1* | 5/2007 | Law et al. ............... 429/42 |
| 2007/0212592 A1 | 9/2007 | Alexandrovichserov et al. |
| 2007/0264560 A1 | 11/2007 | Alexandrovichserov et al. |
| 2007/0275290 A1 | 11/2007 | Alexandrovichserov |
| 2008/0090118 A1 | 4/2008 | Gorobinskiy et al. |
| 2008/0152979 A1 | 6/2008 | Alexandrovichserov et al. |

FOREIGN PATENT DOCUMENTS

| JP | 2006-202643 | 8/2006 |
| KR | 10-2005-0046102 | 5/2005 |
| KR | 10-2005-0051670 | 6/2005 |
| WO | WO 2005/008813 | 1/2005 |

* cited by examiner

*Primary Examiner*—Dah-Wei D Yuan
*Assistant Examiner*—Stephan Essex
(74) *Attorney, Agent, or Firm*—Robert E. Bushnell, Esq.

(57) ABSTRACT

The catalyst for a fuel cell includes a carbon-based material, and Re-Ch supported on the carbon-based material, wherein Ch is selected from the group consisting of S, Se, Te, and combinations thereof. The cathode catalyst has high activity and selectivity for reduction of oxidant and is capable of improving performance of a membrane-electrode assembly and a fuel cell system.

16 Claims, 4 Drawing Sheets

CATALYST FOR FUEL CELL, AND MEMBRANE-ELECTRODE ASSEMBLY FOR FUEL CELL AND FUEL CELL SYSTEM INCLUDING SAME

CROSS-REFERENCE TO RELATED APPLICATION AND CLAIM OF PRIORITY

This application claims priority to and the benefit of Korean Patent Application No. 10-2006-0025235 filed in the Korean Intellectual Property Office on Mar. 20, 2006, the entire content of which is incorporated herein by reference.

BACKGROUND OF THE INVENTION (a) Field of the Invention

The present invention relates to a catalyst for a fuel cell, a membrane-electrode assembly for a fuel cell, and a fuel cell system including the same. More particularly, the present invention relates to a cathode catalyst, and a membrane-electrode assembly and a fuel cell system including the same.

(b) Description of the Related Art

A fuel cell is a power generation system for producing electrical energy through an electrochemical redox reaction of oxidant and hydrogen in a hydrocarbon-based material such as methanol, ethanol, or natural gas.

Representative exemplary fuel cells include a polymer electrolyte membrane fuel cell (PEMFC) and a direct oxidation fuel cell (DOFC). The direct oxidation fuel cell includes a direct methanol fuel cell, which uses methanol as fuel.

The polymer electrolyte membrane fuel cell has an advantage of a high energy density, but it also has problems in the need to carefully handle hydrogen gas and the requirement of accessory facilities such as a fuel reforming processor for reforming methane or methanol, natural gas, and the like in order to produce hydrogen as the fuel gas.

On the contrary, a direct oxidation fuel cell has a lower energy density than that of the polymer electrolyte fuel cell due to a slow reaction rate, but it has the advantages of easy handling of fuel, being capable of operating at room temperature due to its low operation temperature, and no need for additional fuel reforming processors.

In the above fuel cells, a stack that generates electricity includes several to scores of unit cells stacked in multiple layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane between them.

SUMMARY OF THE INVENTION

The present invention provides an improved cathode catalyst, an improved membrane-electrode assembly, and an improved fuel cell system.

One embodiment of the present invention provides a catalyst for a fuel cell having excellent activity and selectivity for reduction of oxidant. Another embodiment of the present invention provides a membrane-electrode assembly for a fuel cell including the cathode catalyst.

Yet another embodiment of the present invention provides a fuel cell system including the membrane-electrode assembly for a fuel cell.

According to one embodiment of the present invention, a catalyst for a fuel cell includes a carbon-based material, and Re-Ch supported on the carbon-based material, wherein Ch is selected from the group consisting of S, Se, Te, and combinations thereof.

The Re-Ch includes 25 to 60 atom % of Re and 75 to 40 atom % of Ch based on the total number of atoms in Re-Ch.

The Re-Ch is supported in an amount of 5 to 85 wt % based on the total weight of the catalyst.

The carbon-based material includes at least one selected from the group consisting of graphite, DENKA BLACK, KETJEN BLACK, carbon nanotube, carbon nanofiber, carbon nanowire, and combinations thereof.

According to another embodiment of the present invention, a membrane-electrode assembly for a fuel cell including an anode and a cathode facing each other and a polymer electrolyte membrane interposed therebetween is provided. The cathode includes the cathode catalyst prepared according to the present invention.

According to yet another embodiment of the present invention, a fuel cell system including an electricity generating element that includes a membrane-electrode assembly and a separator positioned at each side of the membrane-electrode assembly, a fuel supplier that supplies the electricity generating element with fuel, and oxidant supplier that supplies the electricity generating element with oxidant is provided.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
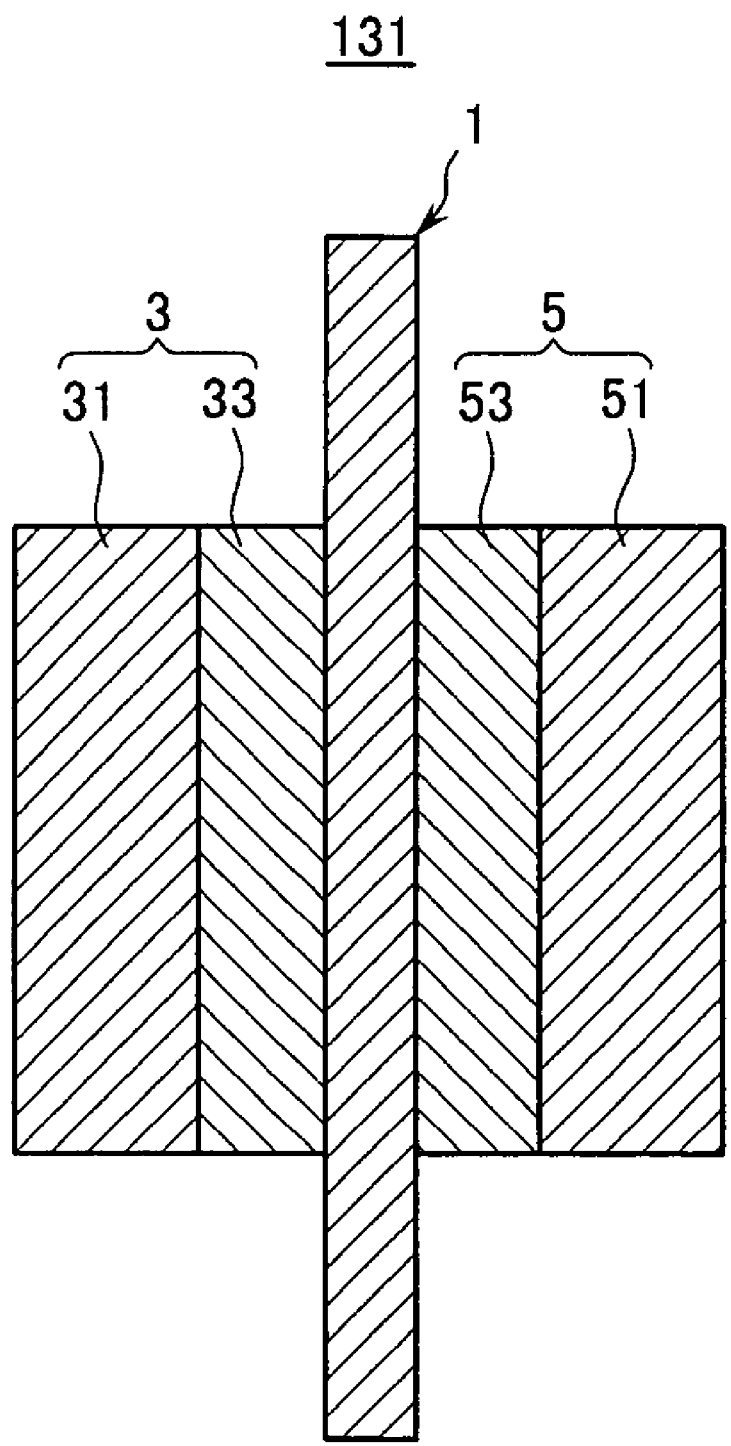
FIG. 1 is a schematic cross-sectional view showing a membrane-electrode assembly according to an embodiment of the present invention.

Exemplary embodiments of the present invention will hereinafter be described in detail with reference to the accompanying drawings.

A fuel cell is a power generation system for generating electrical energy through oxidation of fuel and reduction of oxidant. The oxidation of the fuel occurs at an anode, while the reduction of the oxidant occurs at a cathode.

Both of the anode and the cathode include each a catalyst layer that includes a catalyst to increase the oxidation of the fuel and the reduction of the oxidant, respectively. The catalyst for the anode catalyst layer representatively includes platinum-ruthenium, while that for the cathode catalyst layer may include platinum.

However, platinum as a cathode catalyst has a problem of low reduction of oxidant. It can also be depolarized by fuel that crosses over toward the cathode through an electrolyte membrane, thereby becoming inactivated in a direct oxidation fuel cell. Therefore, attention has been paid to another catalyst that can be substituted for platinum.

The cathode catalyst according to one embodiment of the present invention includes a carbon-based material, and Re-chalcogen (Re-Ch) supported on the carbon-based material, wherein chalcogen (Ch) is selected from the group consisting of S, Se, Te, and combinations thereof. The Re-Ch is an active material for an oxidant reduction reaction, and the carbon-based material is a carrier for supporting the Re-Ch.

In the active material Re-Ch, Re has high catalyst activity for reduction of oxidant. However, oxygen in the air is easily adsorbed to Re and can thereby block the active center of Re, resulting in deterioration of reduction of oxidant.

The chalcogen element such as sulfur (S), selenium (Se), and tellurium (Te) binds with rhenium and prevents oxygen in the air from being bound with rhenium. Thereby, as described above, the chalcogen element lets rhenium have selective activity for an oxidant reduction reaction.

The active material, Re-Ch has excellent activity and selectivity for an oxidant reduction reaction. Therefore, the active material can be used for a cathode catalyst of a fuel cell. In particular, the active material can be effective for a direct oxidation fuel cell having a problem of fuel cross-over since the active material has excellent selectivity for an oxidant reduction reaction. The active material, Re-Ch, has 25% to 35% more improved performance than Ru-Ch and Rh-Ch.

The Re-Ch includes 25 to 60 atom % of Re, and 75 to 40 atom % of Ch. When the amount of Re is more than 60 atom % and the amount of Ch is less than 40 atom %, the selectivity is decreased. On the other hand, when the amount of Re is less than 25 atom %, the activity deteriorates. When the amount of Ch is more than 75 atom %, the whole surface is blocked with Ch so that the activity is deteriorated.

The Re-Ch is supported in the carbon-based material. If Re-Ch is used by itself, the electrical conductivity is too low, and powders thereof are coagulated with each other so that particles with small size cannot be easily obtained. The electrical conductivity of the catalyst is improved by supporting it in the carbon-based material. Further, the specific surface area, that is the surface area per unit weight, is increased by reducing the particle size of the catalyst. The activity per unit weight of the catalyst is increased by enlarging the specific surface area.

For the carrier, examples of a carbon-based material include, but are not limited to, graphite, DENKA BLACK, KETJEN BLACK, carbon nanotube, carbon nanofiber, carbon nanowire, and combinations thereof.

According to one embodiment, the supported amount of Re-Ch in the carbon-based material ranges from 5 to 85 wt % based on the total weight of the catalyst. When the supported amount is less than 5 wt %, the catalyst activity per unit weight is insufficient, while, when it is more than 85 wt %, catalyst particles are coagulated so that the catalyst activity deteriorates.

The cathode catalyst according to embodiments of the present invention is provided by the following manufacturing process of: dissolving rhenium carbonyl in a solvent to provide a solution; adding an elemental source material including an element selected from the group consisting of sulfur, selenium and tellurium and a carbon-cased material to the provided solution and mixing them to obtain a mixture; and drying and heating the provided mixture.

Firstly, rhenium carbonyl is dissolved into a solvent, and an elemental source material including an element selected from the group consisting of sulfur, selenium, and tellurium is added and mixed to the provided solution. The solvent may include benzene, xylene, or toluene, and the elemental source material may include sulfur powder, selenium powder, tellurium powder, $H_2SO_3$, $H_2SeO_3$, or $H_2TeO_3$, but they are not limited thereto. For the carbon-based material, graphite, DENKA BLACK, KETJEN BLACK, carbon nanotube, carbon nanofiber, carbon nanowire, or a mixture thereof may be used as described above.

Subsequently, the mixture prepared as above is dried and heated to provide a cathode catalyst for an embodiment of the present invention. The drying step may be carried out at a temperature ranging from 70 to 100° C. under an air atmosphere. The heating step may be carried out at a temperature ranging from 200 to 400° C. for 2 to 5 hours. Preparing ReS is preferably carried out under a nitrogen atmosphere, and preparing ReSe or ReTe is carried out under a hydrogen atmosphere.

The cathode catalyst obtained from the above process includes both crystalline Re-Ch and amorphous Re-Ch on the carrier. Thereby, activity for the oxidant reduction is improved.

The present invention also provides a membrane-electrode assembly for a fuel cell including the cathode catalyst for a fuel cell.

The membrane-electrode assembly of the present invention includes an anode and a cathode facing each other and a polymer electrolyte membrane interposed therebetween. The anode and the cathode include an electrode substrate formed of a conductive substrate and a catalyst layer formed on the electrode substrate.

FIG. 1 is a schematic cross-sectional view of a membrane-electrode assembly 131 according to an embodiment of the present invention. Hereinafter, a membrane-electrode assembly 131 of an embodiment of the present invention is described in more detail referring to the drawing.

The membrane-electrode assembly 131 generates electrical energy through oxidation of fuel and reduction of oxidant. One or several membrane-electrode assemblies are stacked in a stack.

Oxidant is reduced at a catalyst layer 53 of the cathode, which includes the cathode catalyst of the present invention. The cathode catalyst has excellent selectivity as well as activity for reduction of oxidant, and can thereby improve performance of a cathode 5 and a membrane-electrode assembly 131 including the same.

Fuel is oxidized at a catalyst layer 33 of the anode, which includes a catalyst that is capable of accelerating the oxidation of fuel. The catalyst may be platinum-based as is commonly used in the conventional art. The platinum-based catalyst includes platinum, ruthenium, osmium, a platinum-ruthenium alloy, a platinum-osmium alloy, a platinum-palladium alloy, a platinum-M alloy, or combinations thereof, where M is a transition element selected from the group consisting of Ga, Ti, V, Cr, Mn, Fe, Co, Ni, Cu, Zn, Sn, Mo, W, Rh, Ru, and combinations thereof. Representative examples of the catalyst include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst may be used in the form of a metal itself (black catalyst) or can be used while being supported on a carrier. The carrier may include carbon such as acetylene black, DENKA BLACK, activated carbon, KETJEN BLACK, or graphite, or an inorganic particulate such as alumina, silica, zirconia, or titania. Carbon is generally used in the art.

The catalyst layers 33 and 53 of the anode and the cathode may further include a binder resin to improve adherence and proton transference.

The binder resin may be a proton conductive polymer resin having a cation exchange group selected from the group consisting of a sulfonic acid group, a carboxylic acid group, a phosphoric acid group, a phosphonic acid group, and derivatives thereof, at its side chain. Non-limiting examples of the binder resin include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The binder resin may be used singularly or as a mixture. Optionally, the binder resin may be used along with a non-conductive polymer to improve adherence between a polymer electrolyte membrane and the catalyst layer. The use amount of the binder resin may be adjusted to its usage purpose.

Non-limiting examples of the non-conductive polymer include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE)), ethylenechlorotrifluoro-ethylene copolymers (ECTFE), polyvinylidene fluoride, polyvinylidene fluoride-hexafluoropropylene copolymers (PVdF-HFP), dodecyl benzene sulfonic acid, sorbitol, and combinations thereof.

Electrode substrates 31 and 51 support the electrode, and provide a path for transferring fuel and oxidant to the catalyst. In one embodiment, the electrode substrate is formed from a material such as carbon paper, carbon cloth, or carbon felt, or a metal cloth (a metal film formed on a surface of porous cloth film or a cloth composed of polymer fibers). The electrode substrate is not limited thereto.

A polymer electrolyte membrane 1 plays a role of exchanging ions by transferring the protons produced at the anode catalyst 33 to the cathode catalyst 53. Therefore, the polymer electrolyte membrane 1 includes a highly proton conductive polymer.

The proton conductive polymer of the polymer electrolyte membrane may be any polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), and poly(2,5-benzimidazole).

The H can be replaced with Na, K, Li, Cs, or tetrabutylammonium in a proton conductive group of the proton conductive polymer. When the H is replaced with Na in an ion exchange group at the terminal end of the proton conductive group, NaOH is used. When the H is replaced with tetrabutylammonium, tetrabutylammonium hydroxide is used. K, Li, or Cs can also be replaced by using appropriate compounds. A method of replacing H is known in this related art, and therefore is not described in detail.

A microporous layer (MPL) can be added between the aforementioned electrode substrate and catalyst layer to increase reactant diffusion effects. The microporous layer generally includes conductive powders with a certain particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the electrode substrate. The binder resin of the microporous layer may include, but is not limited to, polytetrafluoro ethylene, polyvinylidene fluoride, polyhexafluoro propylene, polyperfluoro alkyl vinylether, polyperfluorosulfonyl fluoride alkoxyvinyl ether, polyvinyl alcohol, cellulose acetate, or a copolymer thereof. The solvent may include, but is not limited to, an alcohol such as ethanol, isopropyl alcohol, n-propyl alcohol, butanol, and so on, water, dimethyl acetamide, dimethyl sulfoxide, N-methylpyrrolidone, and tetrahydrofuran. The coating method may include, but is not limited to, screen printing, spray coating, doctor blade methods, gravure coating, dip coating, silk screening, painting, and so on, depending on the viscosity of the composition.

The electrode fabrication process can be performed by coating a catalyst composition including catalysts, binders, and solvents using a general method such as spray coating, doctor blade coating, and so on. Since such an electrode fabrication process is well known in this art, it is not described in more detail.

According to an embodiment of the present invention, a fuel cell system including the above membrane-electrode assembly is provided. A fuel cell system of an embodiment of the present invention includes at least one electricity generating element, a fuel supplier, and an oxidant supplier.

The electricity generating element includes a membrane-electrode assembly and separators positioned at both sides of the membrane-electrode assembly. It generates electricity through oxidation of fuel and reduction of oxidant.

The fuel supplier plays a role of supplying the electricity generating element with fuel including hydrogen, and the oxidant supplier plays a role of supplying the electricity generating element with oxidant. The fuel includes liquid or gaseous hydrogen, or a hydrocarbon-based fuel such as methanol, ethanol, propanol, butanol, or natural gas. The oxidant includes pure oxygen or air. The fuel and the oxidant are not limited to the above.

The fuel cell system may be applied to a polymer electrolyte membrane fuel cell (PEMFC), a direct oxidation fuel cell (DOFC), or a mixed reactant fuel cell. According to the embodiment of the present invention, since the cathode catalyst has excellent selectivity for reduction of oxygen, it can be more effectively used for a direct oxidation fuel cell having a cross-over problem of fuel and most effectively for a direct methanol fuel cell (DMFC).

Figure 2:
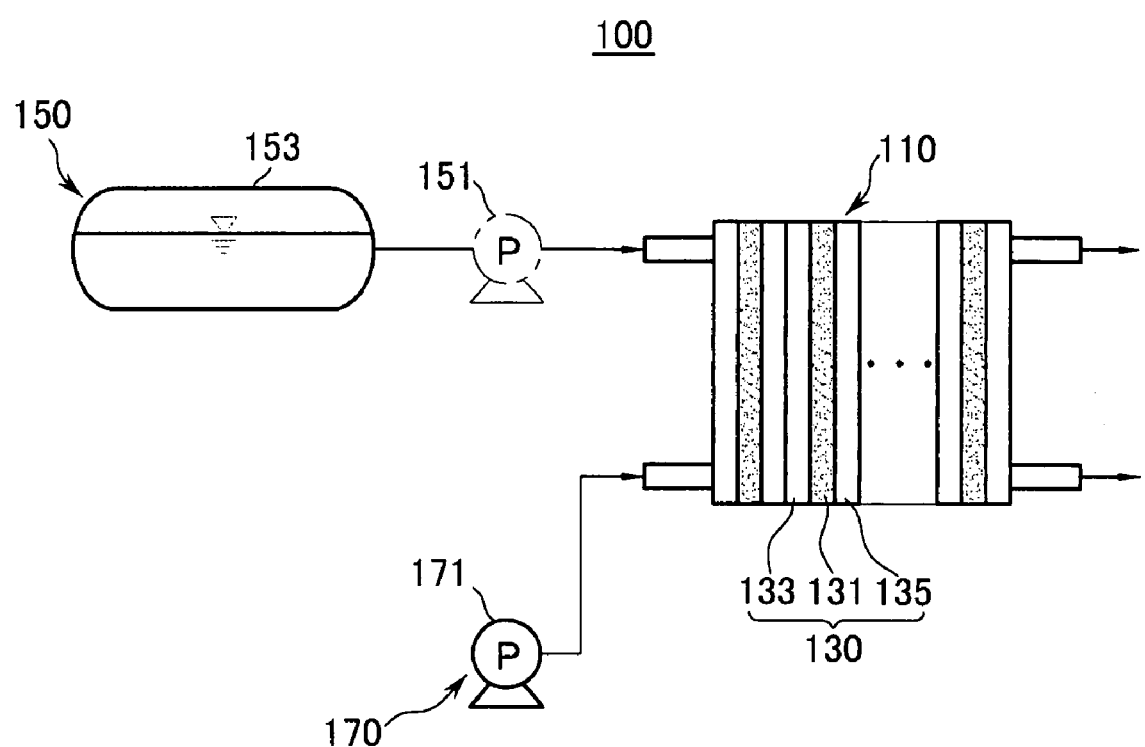
FIG. 2 is a schematic diagram showing the structure of a fuel cell system according to another embodiment of the present invention.

FIG. 2 shows a schematic structure of a fuel cell system 100 that will be described in detail with reference to this accompanying drawing, as follows. FIG. 2 illustrates a fuel cell system wherein fuel and oxidant are provided to an electricity generating element 130 through pumps 151 and 171, but the present invention is not limited to such a structure. The fuel cell system of the present invention alternatively includes a structure wherein fuel and oxidant are provided in a diffusion manner.

The fuel cell system 100 includes a stack 110 composed of at least one electricity generating element 130 that generates electrical energy through an electrochemical reaction of fuel and oxidant, a fuel supplier 150 for supplying the fuel to the electricity generating element 130, and an oxidant supplier 170 for supplying the oxidant to the electricity generating element 130.

In addition, the fuel supplier 150 is equipped with a tank 153 that stores the fuel, and a pump 151 that is connected therewith. The fuel pump 151 supplies the fuel stored in the tank 153 with a predetermined pumping power.

The oxidant supplier 170, which supplies the electricity generating element 130 of the stack 110 with the oxidant, is equipped with at least one pump 171 for supplying the oxidant with a predetermined pumping power.

The electricity generating element 130 includes a membrane-electrode assembly 131 that oxidizes hydrogen or the fuel and reduces the oxidant, and separators 133 and 135 that are respectively positioned at opposite sides of the membrane-electrode assembly and supply hydrogen or the fuel, and the oxidant, respectively.

The following examples illustrate the present invention in more detail. However, it is understood that the present invention is not limited by these examples.

Example 1

0.8 g of rhenium carbonyl, 0.03 g of Se, and 1 g of KETJEN BLACK were mixed and filtered in 150 ml of toluene 150 ml at 140° C. for 24 hours. Then, the filtration product was dried at 80° C., and heated at 250° C. for 3 hours with inflowing $H_2$ to provide a cathode catalyst for a fuel cell in which Re—Se is supported in a KETJEN BLACK. Here, the Re amount and the Se amount in Re—Se were 50 atom % and 50 atom %, respectively, and the supported amount of Re—Se was 45 wt % based on the total weight of the catalyst.

Example 2

0.8 g of rhenium carbonyl, 0.06 g of Te, and 1 g of KETJEN BLACK were mixed and filtered in 150 ml of toluene 140° C. for 24 hours. Then, the filtered product was dried at 80° C., and heated at 250° C. for 3 hours with inflowing $H_2$ to provide a cathode catalyst for a fuel cell in which Re—Te is supported in a KETJEN BLACK. Here, the Re amount and the Te amount in Re—Te were 47 atom % and 53 atom %, respectively, and the supported amount of Re—Te was 49 wt % based on the total weight of the catalyst.

Example 3

0.8 g of rhenium carbonyl, 0.1 g of S, and 1 g of KETJEN BLACK were mixed and filtered in 150 ml of toluene 140° C. for 24 hours. Then, the filtered product was dried at 80° C., and heated at 250° C. for 3 hours with inflowing $H_2$ to provide a cathode catalyst for a fuel cell in which Re—S is supported in a KETJEN BLACK. Here, the Re amount and the S amount in Re—S were 49 atom % and 51 atom %, respectively, and the supported amount of Re—S was 49 wt % based on the total weight of the catalyst.

Comparative Example 1

0.6 g of ruthenium carbonyl, 0.03 g of Se, and 1 g of carbon were mixed and filtered in 150 ml of toluene 140° C. for 24 hours. Then, the filtered product was dried at 80° C., and heated at 250° C. for 3 hours with inflowing $H_2$ to provide a cathode catalyst for a fuel cell.

An oxygen-saturated sulfuric acid solution was prepared by bubbling oxygen gas for 2 hours in a sulfuric acid solution of 0.5M concentration. A working electrode was prepared by loading the catalysts according to Examples 1 to 3 and Comparative Example 1 on glassy carbon to be $3.78 \times 10^{-3}$ mg, while AgCl was employed as a reference electrode and platinum was employed as a counter electrode. Then, three electrodes were placed into the oxygen-saturated sulfuric acid solution for 30 minutes. Current density was measured at a rotating rate of 2000 rpm and a scan rate of 10 mV/s while changing voltage.

Figure 3:
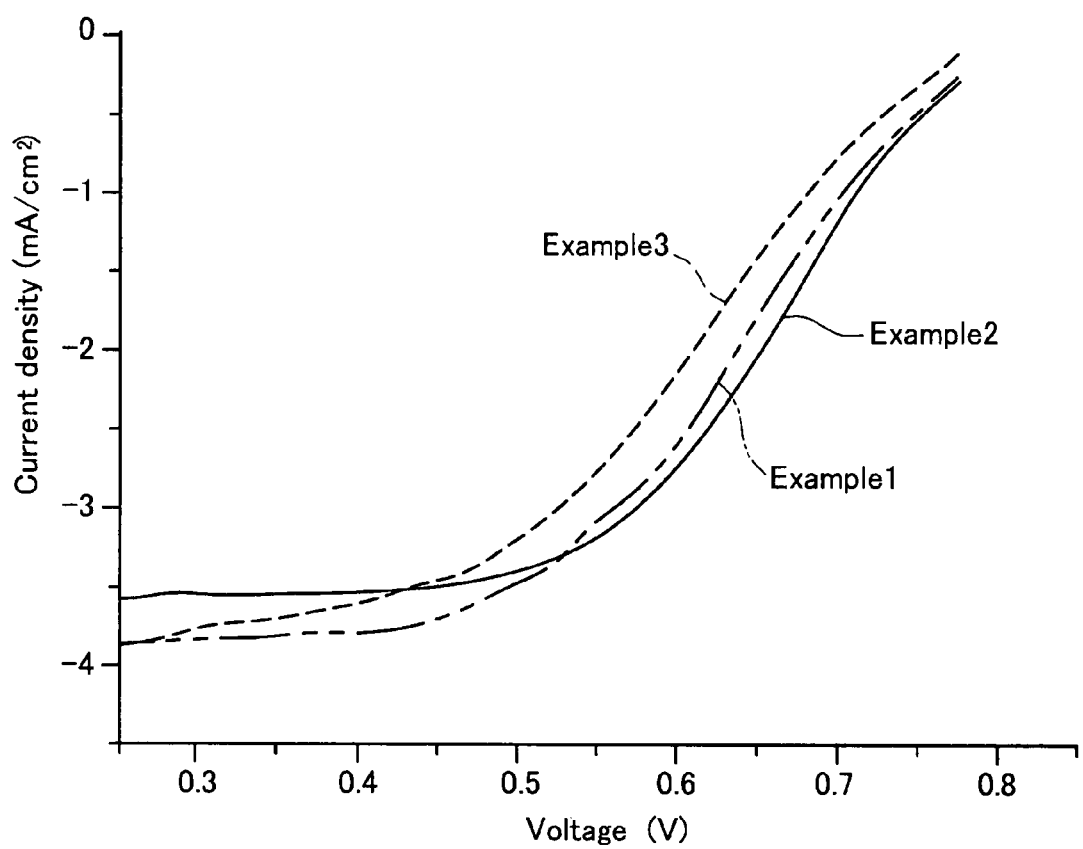
FIG. 3 is a graph showing current density measurement results depending on a voltage of cathode catalysts according to Examples 1 to 3.

FIG. 3 shows current density measurement results depending on a voltage of the cathode catalysts according to Examples 1 to 3. As shown in FIG. 3, it is confirmed that all the cathode catalysts according to Examples 1 to 3 exhibited excellent current density. Among them, that of Example 1 showed the most excellent current density.

Figure 4:
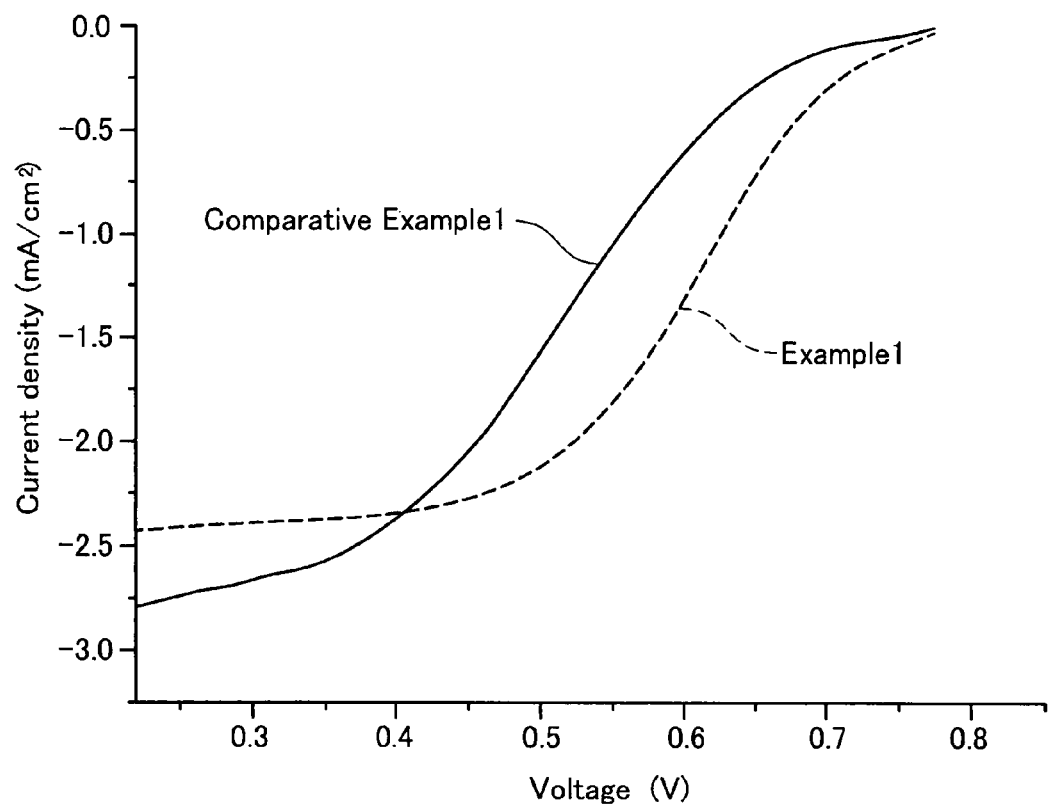
FIG. 4 is a graph showing current density measurement results depending on a voltage of cathode catalysts according to Example 1 and Comparative Example 1.

Further, FIG. 4 shows current density measurement results depending on a voltage of the cathode catalysts according to Example 1 and Comparative Example 1. As shown in FIG. 4, it is confirmed that the catalyst according to Example 1 had improved catalyst activity compared to that according to Comparative Example 1.

The cathode catalyst according to the embodiments of the present invention has excellent activity and selectivity for the oxidant reduction. Therefore, it is possible to improve the membrane-electrode assembly for a fuel cell and the fuel cell system including the same.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A fuel cell, comprising:
   a catalyst comprised of:
      a carbon-based material; and
      Re-Ch supported on the carbon-based material, wherein Ch is selected from the group consisting of S, Se, Te, and combinations thereof, the supported Re-Ch being in an amount of 45 to 49 wt % based on the total weight of the catalyst.

2. The catalyst of claim 1, wherein the Re-Ch comprises 25 to 60 atom % of Re and 75 to 40 atom % of Ch based on the total number of atoms in Re-Ch.

3. The catalyst of claim 1, wherein the carbon-based material comprises at least one selected from the group consisting of graphite, denka black, ketjen black, carbon nanotube, carbon nanofiber, carbon nanowire, and combinations thereof.

4. The catalyst of claim 1, wherein Ch is S.

5. The catalyst of claim 1, wherein Ch is Se.

6. The catalyst of claim 1, wherein Ch is Te.

7. The catalyst of claim 1, the Re-Ch comprises crystalline Re-Ch and amorphous Re-Ch.

8. A membrane-electrode assembly for a fuel cell, comprising a first electrode, a second electrode facing the first electrode, the second electrode comprising the catalyst of claim 1, and a polymer electrolyte membrane interposed between the first electrode and the second electrode.

9. A membrane-electrode assembly for a fuel cell, comprising:
an anode;
a cathode facing the anode, the cathode comprising a cathode catalyst comprising:
a carbon-based material; and
Re-Ch supported on the carbon-based material, wherein Ch is selected from the group consisting of S, Se, Te, and combinations thereof, and the Re-Ch is supported in an amount of 45 to 49 wt % based on the total weight of the cathode catalyst; and
a polymer electrolyte membrane interposed between the anode and the cathode.

10. The membrane-electrode assembly of claim 9, wherein the cathode catalyst is supported on a carrier selected from the group consisting of acetylene black, denka black, activated carbon, ketjen black, graphite, alumina, silica, titania, zirconia, and combinations thereof.

11. The membrane-electrode assembly of claim 9, the Re-Ch comprises crystalline Re-Ch and amorphous Re-Ch.

12. A fuel cell system comprising:
an electricity generating element, comprising:
a membrane-electrode assembly comprising
an anode;
a cathode facing the anode, the cathode comprising a cathode catalyst comprising a carbon-based material and Re-Ch supported on the carbon-based material, wherein Ch is selected from the group consisting of S, Se, Te, and combinations thereof, and the Re-Ch is supported in an amount of 45 to 49 wt % based on the total weight of the cathode catalyst; and
a polymer electrolyte membrane interposed between the anode and the cathode; and
a separator positioned at each side of the membrane-electrode assembly;
a fuel supplier supplying the electricity generating element with fuel; and
an oxidant supplier supplying the electricity generating element with oxidant.

13. The fuel cell system of claim 12, wherein the Re-Ch comprises 25 to 60 atom % of Re and 75 to 40 atom % of Ch based on the total number of atoms in Re-Ch.

14. The fuel cell system of claim 12, wherein the carbon-based material comprises at least one selected from the group consisting of graphite, denka black, ketjen black, carbon nanotube, carbon nanofiber, carbon nanowire, and combinations thereof.

15. The fuel cell system of claim 12, which is selected from the group consisting of a polymer electrolyte fuel cell and a direct oxidation fuel cell.

16. The fuel cell system of claim 15, which is a direct oxidation fuel cell.

* * * * *